United States Patent
Morgan

(10) Patent No.: US 12,214,231 B1
(45) Date of Patent: Feb. 4, 2025

(54) EMERGENCY VEHICULAR WINDOW-BREAKING DEVICE

(71) Applicant: Daniel Morgan, Murrells Inlet, SC (US)

(72) Inventor: Daniel Morgan, Murrells Inlet, SC (US)

( * ) Notice: Subject to any disclaimer, the term of this patent is extended or adjusted under 35 U.S.C. 154(b) by 0 days.

(21) Appl. No.: 18/483,681

(22) Filed: Oct. 10, 2023

(51) Int. Cl.
*A62B 3/00* (2006.01)
*B60R 21/01* (2006.01)
*B60R 21/00* (2006.01)

(52) U.S. Cl.
CPC .............. *A62B 3/005* (2013.01); *B60R 21/01* (2013.01); *B60R 2021/0016* (2013.01); *B60R 2021/01252* (2013.01)

(58) Field of Classification Search
CPC . A62B 3/005; B60R 21/01; B60R 2021/0016; B60R 2021/01252
See application file for complete search history.

(56) References Cited

U.S. PATENT DOCUMENTS

| | | | |
|---|---|---|---|
| 5,791,056 A | 8/1998 | Messina | |
| 6,418,628 B1 * | 7/2002 | Steingass | B60R 22/32 30/367 |
| 7,988,078 B1 * | 8/2011 | Roy | A62B 3/005 241/99 |
| 8,869,927 B2 * | 10/2014 | Oosterhuis | B60J 1/20 180/274 |
| D794,408 S | 8/2017 | Colasse | |
| 10,486,643 B1 * | 11/2019 | Raybon | B60R 21/02 |
| 11,351,404 B2 * | 6/2022 | Hyde | B60R 21/00 |
| 2013/0146381 A1 * | 6/2013 | Oosterhuis | B60J 1/20 180/271 |
| 2013/0167601 A1 * | 7/2013 | Colasse | B25D 1/02 70/395 |
| 2020/0298028 A1 * | 9/2020 | Hyde | B60R 21/017 |
| 2021/0039575 A1 * | 2/2021 | Hyde | B60R 21/00 |
| 2021/0244974 A1 | 8/2021 | Uozumi | |

FOREIGN PATENT DOCUMENTS

WO 2011122941 10/2011

* cited by examiner

*Primary Examiner* — Karen Beck
(74) *Attorney, Agent, or Firm* — Kyle A. Fletcher, Esq.

(57) ABSTRACT

The emergency vehicular window-breaking device includes a striker mechanism and a trigger. The emergency vehicular window-breaking device may be operable to shatter a window of a vehicle that has become at least partially submerged so that an occupant of the vehicle may escape. The emergency vehicular window-breaking device may be located within the vehicle where the striker mechanism may strike the window and the trigger may be exposed to rising water as the vehicle sinks. The striker mechanism may shatter the window glass after activation by the trigger. The trigger may activate the striker mechanism responsive to being submerged.

17 Claims, 4 Drawing Sheets

EMERGENCY VEHICULAR WINDOW-BREAKING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of emergency evacuation systems and vehicular safety systems, more specifically, an emergency vehicular window-breaking device.

SUMMARY OF INVENTION

The emergency vehicular window-breaking device comprises a striker mechanism and a trigger. The emergency vehicular window-breaking device may be operable to shatter a window of a vehicle that has become at least partially submerged so that an occupant of the vehicle may escape. The emergency vehicular window-breaking device may be located within the vehicle where the striker mechanism may strike the window and the trigger may be exposed to rising water as the vehicle sinks. The striker mechanism may shatter the window glass after activation by the trigger. The trigger may activate the striker mechanism responsive to being submerged. As non-limiting examples, the emergency vehicular window-breaking device may be located within a door of the vehicle and may shatter a side window when the vehicle submerges in body of water.

An object of the invention is to shatter the window glass of a window of a vehicle when the vehicle is submerged in water. Another object of the invention is to shatter the window glass by releasing a spring-loaded striker to impact the window glass when the striker is rotated to a triggered position.

A further object of the invention is to retain the striker in a non-triggered position by interference between a retaining pin on the striker and a retention block on a striker mounting bracket.

Yet another object of the invention is to activate the striker using a float that is lifted within a guide tube by rising water until the float rotates the striker from the non-triggered position to the triggered position.

These together with additional objects, features and advantages of the emergency vehicular window-breaking device will be readily apparent to those of ordinary skill in the art upon reading the following detailed description of the presently preferred, but nonetheless illustrative, embodiments when taken in conjunction with the accompanying drawings.

In this respect, before explaining the current embodiments of the emergency vehicular window-breaking device in detail, it is to be understood that the emergency vehicular window-breaking device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the emergency vehicular window-breaking device.

It is therefore important that the claims be regarded as including such equivalent construction insofar as they do not depart from the spirit and scope of the emergency vehicular window-breaking device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
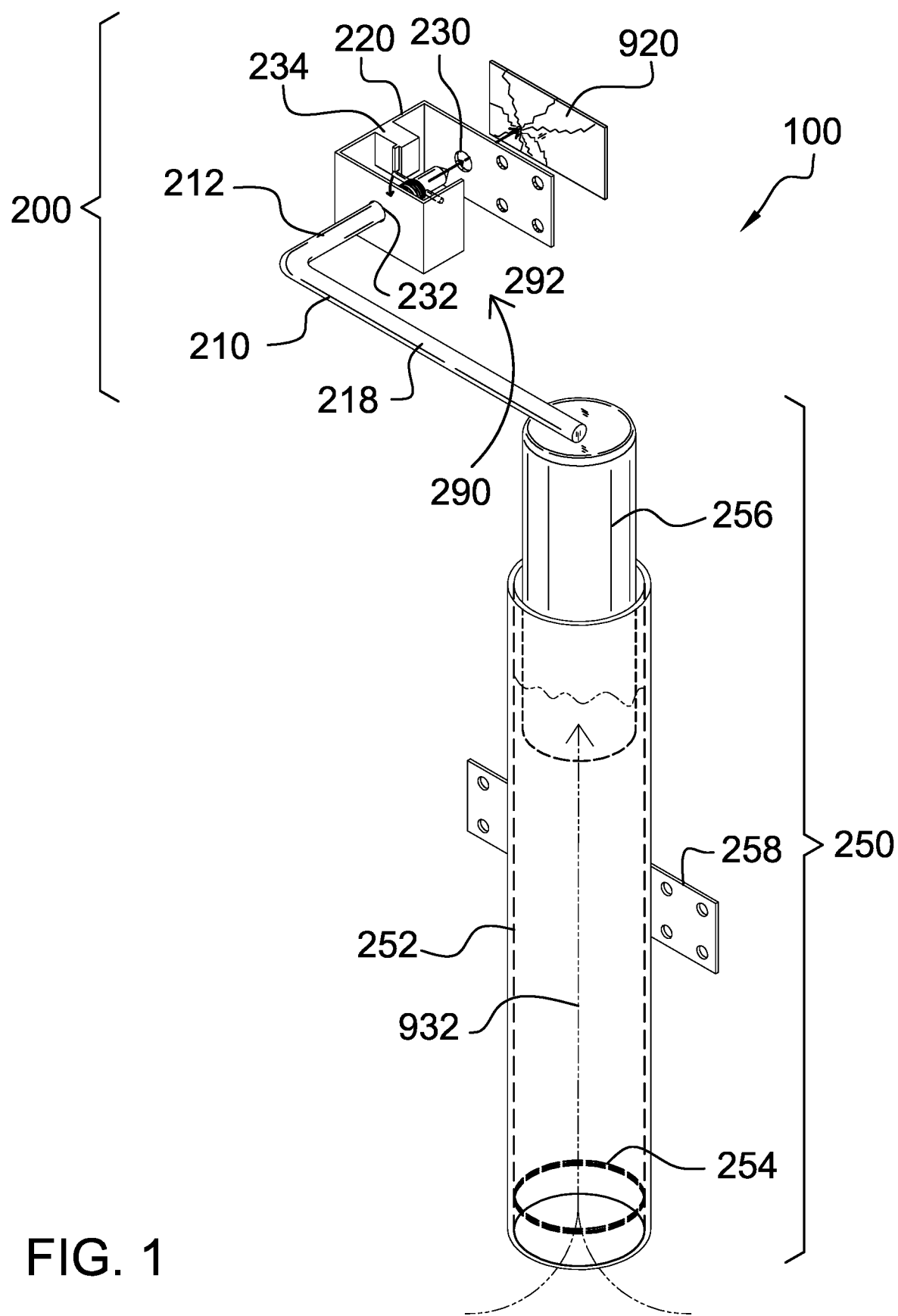
FIG. 1 is an in-use view of an embodiment of the disclosure.
Figure 2:
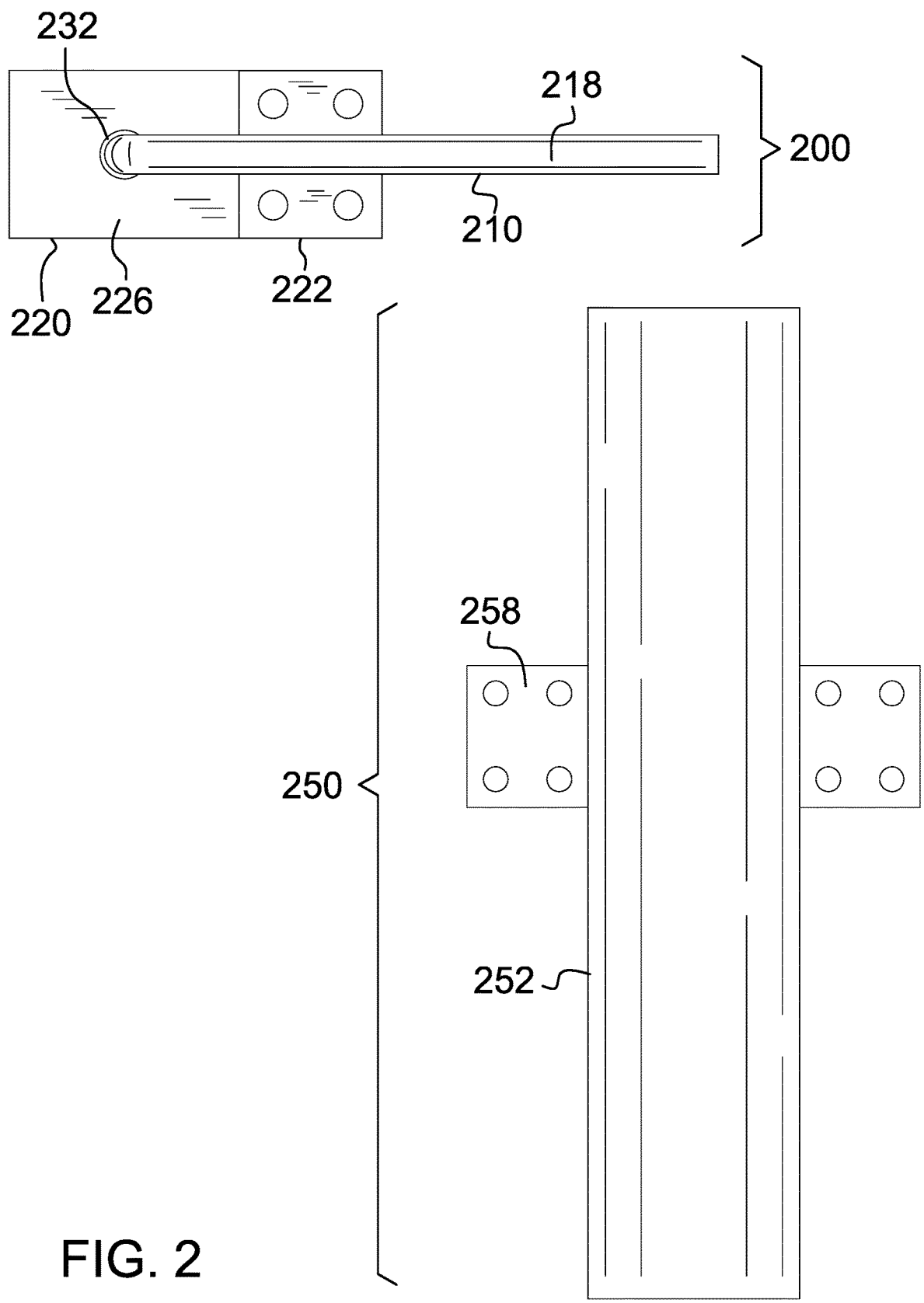
FIG. 2 is a front view of an embodiment of the disclosure.
Figure 3:
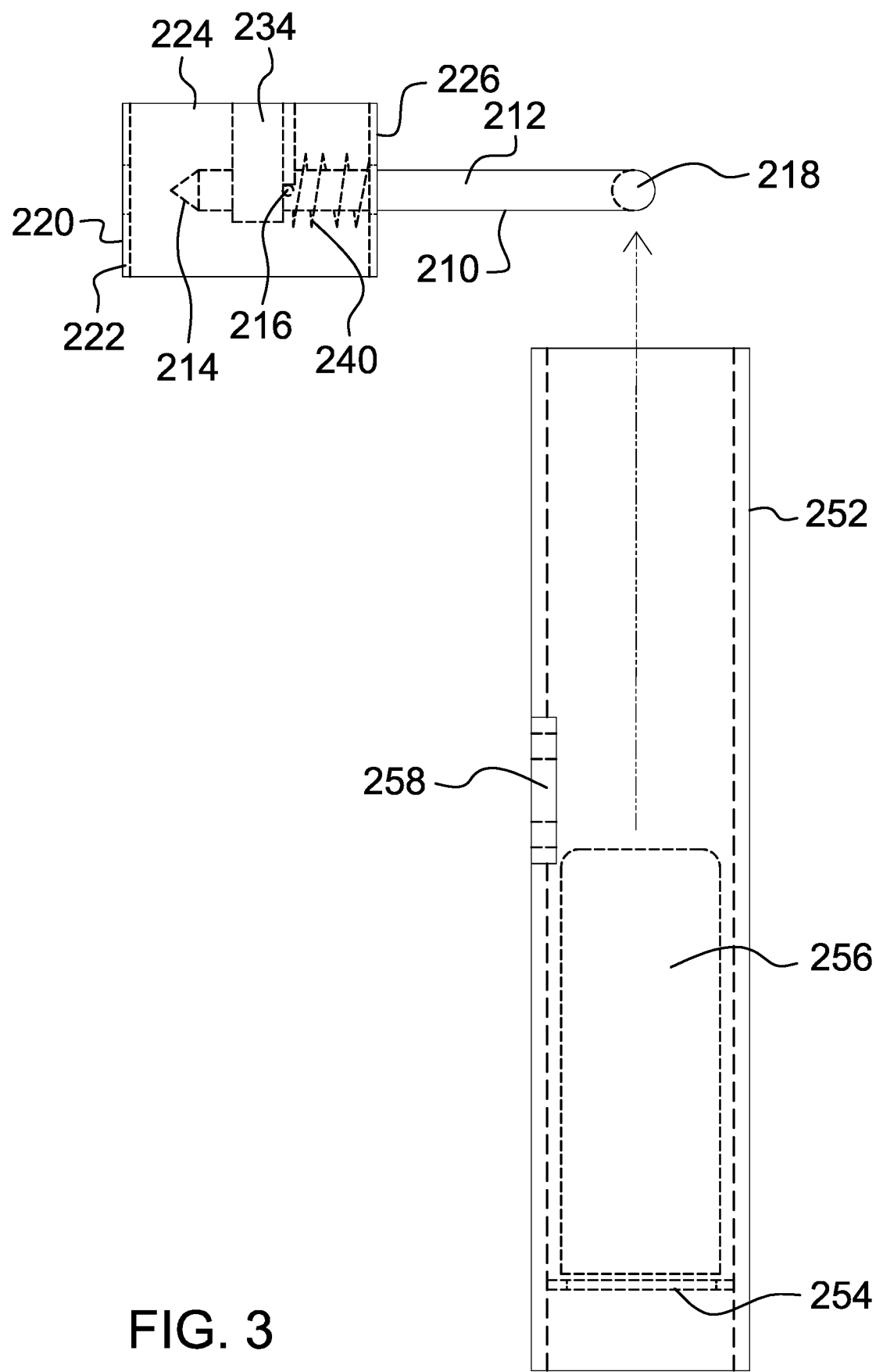
FIG. 3 is a side view of an embodiment of the disclosure.
Figure 4:
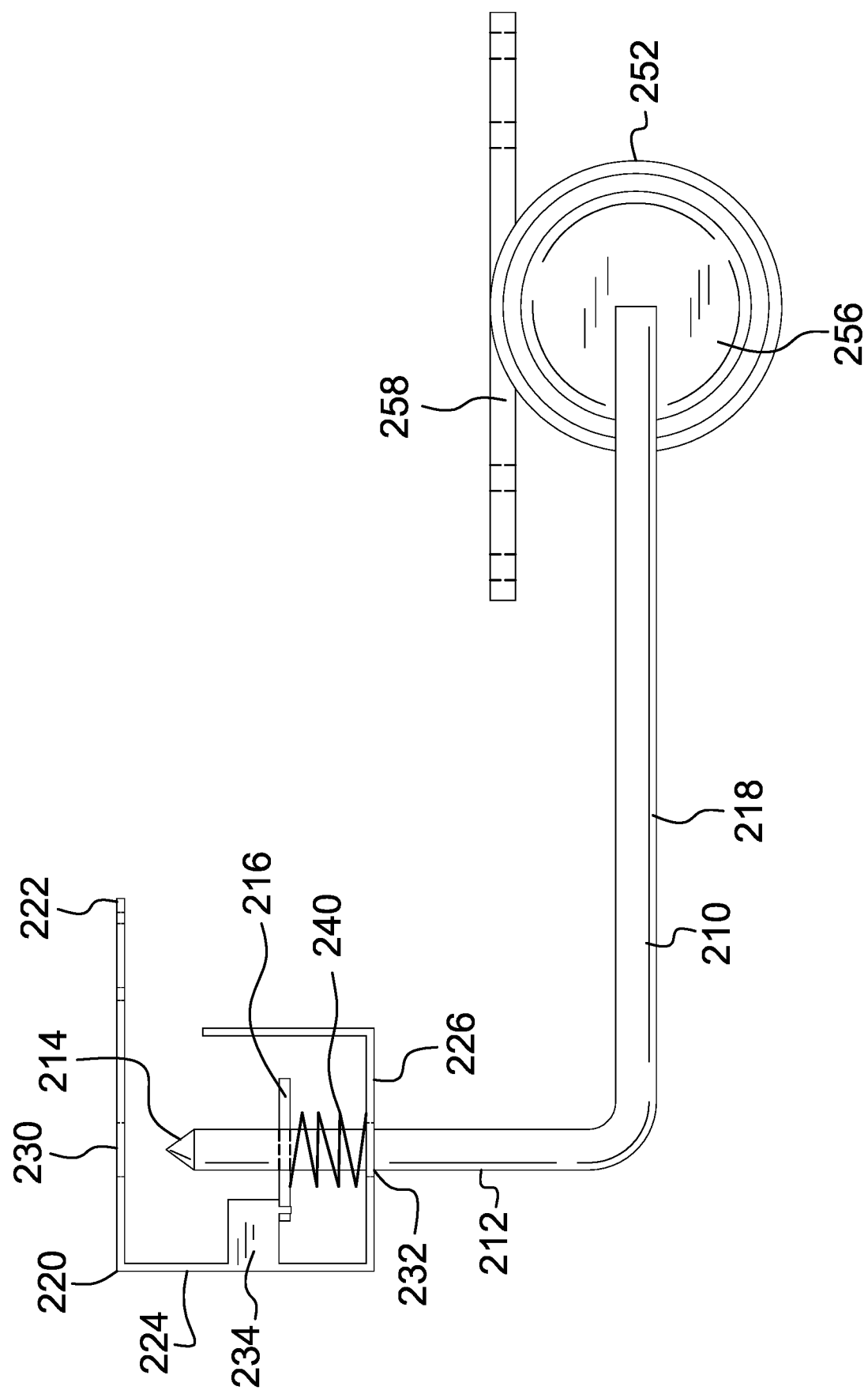
FIG. 4 is a top view of an embodiment of the disclosure.

Detailed reference will now be made to a first potential embodiment of the disclosure, which is illustrated in FIGS. 1 through 4.

The emergency vehicular window-breaking device 100 (hereinafter invention) comprises a striker mechanism 200 and a trigger 250. The invention 100 may be operable to shatter a window of a vehicle that has become at least partially submerged so that an occupant of the vehicle may escape. The invention 100 may be located within the vehicle where the striker mechanism may strike the window and the trigger 250 may be exposed to rising water 932 as the vehicle sinks. The striker mechanism 200 may shatter the window glass 920 after activation by the trigger 250. The trigger 250 may activate the striker mechanism 200 responsive to being submerged. As non-limiting examples, the invention 100 may be located within a door of the vehicle and may shatter a side window when the vehicle submerges in body of water.

The striker mechanism 200 may comprise a striker 210, a striker mounting bracket 220, and a compression spring 240. The striker mounting bracket 220 may hold the striker 210 away from the window glass 920 and under tension from the compression spring 240. The compression spring 240 may force the striker 210 to impact the window glass 920 after the striker 210 is activated by the trigger 250.

The striker 210 may be an L-shaped armature comprising a punch leg 212 and a trigger leg 218. The punch leg 212 may comprise a tip 214 and may be oriented to be perpendicular to the window glass 920. The tip 214 may be sharpened to a point such that the tip 214 may shatter the window glass 920 when the tip 214 impacts the window glass 920. The punch leg 212 may comprise a retaining pin 216 that holds the striker 210 away from the window glass 920 due to interference with a retention block 234 located on the striker mounting bracket 220. The trigger leg 218 may be perpendicular to the punch leg 212. Lifting the distal end of the trigger leg 218 may rotate the punch leg 212 such that the retaining pin 216 may disengage from the retention block 234 to permit movement of the striker 210 towards the window glass 920.

The striker mounting bracket 220 may comprise a window plate 222, a spring plate 226, and a center plate 224. The striker mounting bracket 220 may be coupled to the vehicle. The striker mounting bracket 220 may position the striker 210 to impact the window glass 920. The striker mounting bracket 220 may position the striker 210 relative to the trigger 250 such that the trigger 250 may activate the striker 210 responsive to the rising water 932.

The window plate 222 may be oriented to be parallel to the window glass 920 and adjacent to the window glass 920. The window plate 222 may comprise a first striker aperture 230. Responsive to being activated, the striker 210 may impact the window glass 920 by moving towards the window glass 920 through the first striker aperture 230. In some embodiments, the window plate 222 may comprise a plurality of mounting apertures for coupling the striker mechanism 200 to the vehicle.

The spring plate 226 may be parallel to the window plate and is more distant from the window glass 920 than the window plate 222. The spring plate 226 may comprise a second striker aperture 232. The punch leg 212 may pass through the second striker aperture 232 in order to support the striker 210.

The center plate 224 may be perpendicular to both the window plate 222 and the spring plate 226. The center plate 224 may couple the window plate 222 to the spring plate 226 to form the window plate 222, the spring plate 226, and the center plate 224 into a U-shaped armature.

The center plate 224 may comprise the retention block 234. The retention block 234 may project from the center of the center plate 224 into the center of the U-shaped armature formed by the window plate 222, the spring plate 226, and the center plate 224. The retention block 234 may prevent the striker 210 from moving towards the window glass 920 when the trigger 250 is rotated to a non-triggered position 290 where the retaining pin 216 aligns with the retention block 234 such that the retaining pin 216 contacts the retention block 234. The striker 210 may permit the striker 210 to move towards the window glass 920 when the trigger 250 is rotated to a triggered position 292 where the alignment of the retaining pin 216 with the retention block 234 is disrupted.

The compression spring 240 may be located between the spring plate 226 and the retaining pin 216. The compression spring 240 may provide tension to move the striker 210 when the striker 210 is in the non-triggered position 290. The compression spring 240 may force the striker 210 to impact the window glass 920 when the striker 210 is rotated to the triggered position 292 where that interference between the retaining pin 216 and the retention block 234 may be eliminated.

The trigger 250 may be operable to sense the rising water 932 and to activate the striker mechanism 200 in order to shatter the window glass 920. The trigger 250 may comprise a guide tube 252, a float 256, and a sensor mounting bracket 258.

The guide tube 252 may be a hollow vertical tube that May be positioned below the distal end of the trigger leg 218. The float 256 may be a buoyant cylinder comprising an outside diameter that is smaller than the inside diameter of the guide tube 252. The float 256 may be located inside of the guide tube 252 such that the float 256 may move up within the guide tube 252 responsive to the rising water 932. The float 256 may press up against the trigger leg 218 and may rotate the striker 210 from the non-triggered position 290 to the triggered position 292, thus activating the striker 210. The guide tube 252 may comprise a float stop 254 on the inside bottom of the guide tube 252. The float stop 254 may be a ridge around the guide tube 252 to reduce the inside diameter of the guide tube 252 such that the float 256 may be prevented from passing through the guide tube 252 below the float stop 254. The float stop 254 may be operable to limit the downward travel of the float 256.

The sensor mounting bracket 258 may be operable to couple the guide tube 252 to the vehicle such that the guide tube 252 is vertically aligned under the distal end of the trigger leg 218 of the trigger 250.

In use, the invention 100 may be installed within a vehicle adjacent to a window. As a non-limiting example, the invention 100 may be installed within a door of the vehicle adjacent to a side window. The striker mechanism 200 may be positioned such that the tip 214 of the striker 210 may impact the window and the guide tube 252 may be positioned under the distal end of the trigger leg 218. The striker 210 may be forced away from the window and rotated to the non-triggered position 290 such that interference between the retaining pin 216 and the retention block 234 may prevent the tip 214 from contacting the window glass 920. Responsive to the vehicle becoming submerged in body of water, the float 256 may rise to the top of the guide tube 252 and may press against the trigger leg 218 of the striker 210. The striker 210 may rotate from the non-triggered position 290 to the triggered position 292 and the compression spring 240 may force the striker 210 to impact the window glass 920, thus shattering the window glass 920.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used in this disclosure, a "compression spring" may be a wire coil that resists forces attempting to compress the wire coil in the direction of the center axis of the wire coil. The compression spring will return to its original position when the compressive force is removed.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "inside diameter" or "inner diameter" may refer to a measurement made on a hollow object. Specifically, the inside diameter is the distance from one inside wall to the opposite inside wall.

As used herein, "outside diameter" or "outer diameter" may refer to a measurement made on an object. Specifically, the outside diameter is the distance from one point on the outside of the object to a point on the opposite side of the object along a line passing through the center of the object.

As used herein, "travel" or "travel distance" may refer to the maximum distance that a mechanical part may move due to constraints imposed by the system. As a non-limiting example, the travel distance of a component may be constrained by interference with one or more other components such as mechanical stops.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An emergency vehicular window-breaking device comprising:
    a striker mechanism and a trigger;
    wherein the emergency vehicular window-breaking device is operable to shatter a window of a vehicle that has become at least partially submerged;
    wherein the emergency vehicular window-breaking device is located within the vehicle where the striker mechanism strikes the window and the trigger is exposed to rising water as the vehicle sinks;
    wherein the striker mechanism shatters a window glass after activation by the trigger;
    wherein the trigger activates the striker mechanism responsive to being submerged;
    wherein the striker mechanism comprises a striker, a striker mounting bracket, and a compression spring;
    wherein the striker mounting bracket holds the striker away from the window glass and under tension from the compression spring;
    wherein the compression spring forces the striker to impact the window glass after the striker is activated by the trigger;
    wherein the striker is an L-shaped armature comprising a punch leg and a trigger leg;
    wherein the punch leg comprises a tip and is oriented to be perpendicular to the window glass;
    wherein the tip is sharpened to a point such that the tip shatters the window glass when the tip impacts the window glass.

2. The emergency vehicular window-breaking device according to claim 1
    wherein the punch leg comprises a retaining pin that holds the striker away from the window glass due to interference with a retention block located on the striker mounting bracket.

3. The emergency vehicular window-breaking device according to claim 2
    wherein the trigger leg is perpendicular to the punch leg;
    wherein lifting the distal end of the trigger leg rotates the punch leg such that the retaining pin disengages from the retention block to permit movement of the striker towards the window glass.

4. The emergency vehicular window-breaking device according to claim 3
    wherein the striker mounting bracket comprises a window plate, a spring plate, and a center plate;
    wherein the striker mounting bracket is coupled to the vehicle;
    wherein the striker mounting bracket positions the striker to impact the window glass;
    wherein the striker mounting bracket positions the striker relative to the trigger such that the trigger activates the striker responsive to the rising water.

5. The emergency vehicular window-breaking device according to claim 4
    wherein the window plate is oriented to be parallel to the window glass and adjacent to the window glass;

wherein the window plate comprises a first striker aperture;

wherein responsive to being activated, the striker impacts the window glass by moving towards the window glass through the first striker aperture.

6. The emergency vehicular window-breaking device according to claim 5 wherein the spring plate is parallel to the window plate and is more distant from the window glass than the window plate.

7. The emergency vehicular window-breaking device according to claim 6 wherein the spring plate comprises a second striker aperture;

wherein the punch leg passes through the second striker aperture in order to support the striker.

8. The emergency vehicular window-breaking device according to claim 7 wherein the center plate is perpendicular to both the window plate and the spring plate;

wherein the center plate couples the window plate to the spring plate to form the window plate, the spring plate, and the center plate into a U-shaped armature.

9. The emergency vehicular window-breaking device according to claim 8 wherein the center plate comprises the retention block;

wherein the retention block projects from the center of the center plate into the center of the U-shaped armature formed by the window plate, the spring plate, and the center plate.

10. The emergency vehicular window-breaking device according to claim 9 wherein the retention block prevents the striker from moving towards the window glass when the trigger is rotated to a non-triggered position where the retaining pin aligns with the retention block such that the retaining pin contacts the retention block;

wherein the striker permits the striker to move towards the window glass when the trigger is rotated to a triggered position where the alignment of the retaining pin with the retention block is disrupted.

11. The emergency vehicular window-breaking device according to claim 10 wherein the compression spring is located between the spring plate and the retaining pin;

wherein the compression spring provides tension to move the striker when the striker is in the non-triggered position.

12. The emergency vehicular window-breaking device according to claim 11 wherein the compression spring forces the striker to impact the window glass when the striker is rotated to the triggered position where that interference between the retaining pin and the retention block is eliminated.

13. The emergency vehicular window-breaking device according to claim 12 wherein the trigger is operable to sense the rising water and to activate the striker mechanism in order to shatter the window glass;

wherein the trigger comprises a guide tube, a float, and a sensor mounting bracket.

14. The emergency vehicular window-breaking device according to claim 13 wherein the guide tube is a hollow vertical tube that is positioned below the distal end of the trigger leg;

wherein the float is a buoyant cylinder comprising an outside diameter that is smaller than the inside diameter of the guide tube.

15. The emergency vehicular window-breaking device according to claim 14 wherein the float is located inside of the guide tube such that the float moves up within the guide tube responsive to the rising water;

wherein the float presses up against the trigger leg and rotates the striker from the non-triggered position to the triggered position, thus activating the striker.

16. The emergency vehicular window-breaking device according to claim 15 wherein the guide tube comprises a float stop on the inside bottom of the guide tube;

wherein the float stop is a ridge around the guide tube to reduce the inside diameter of the guide tube such that the float is prevented from passing through the guide tube below the float stop;

wherein the float stop is operable to limit the downward travel of the float.

17. The emergency vehicular window-breaking device according to claim 16 wherein the sensor mounting bracket is operable to couple the guide tube to the vehicle such that the guide tube is vertically aligned under the distal end of the trigger leg of the trigger.

* * * * *